(No Model.)

T. B. ABERNATHY.
BOX CUTTING AND NAILING MACHINE.

No. 593,551. Patented Nov. 9, 1897.

10 Sheets—Sheet 3.

Witnesses:
Wm. N. Rheem.
Wm. F. Henning.

Inventor:
Thomas B. Abernathy
by Bond, Adams, Pickard & Jackson,
his Attys.

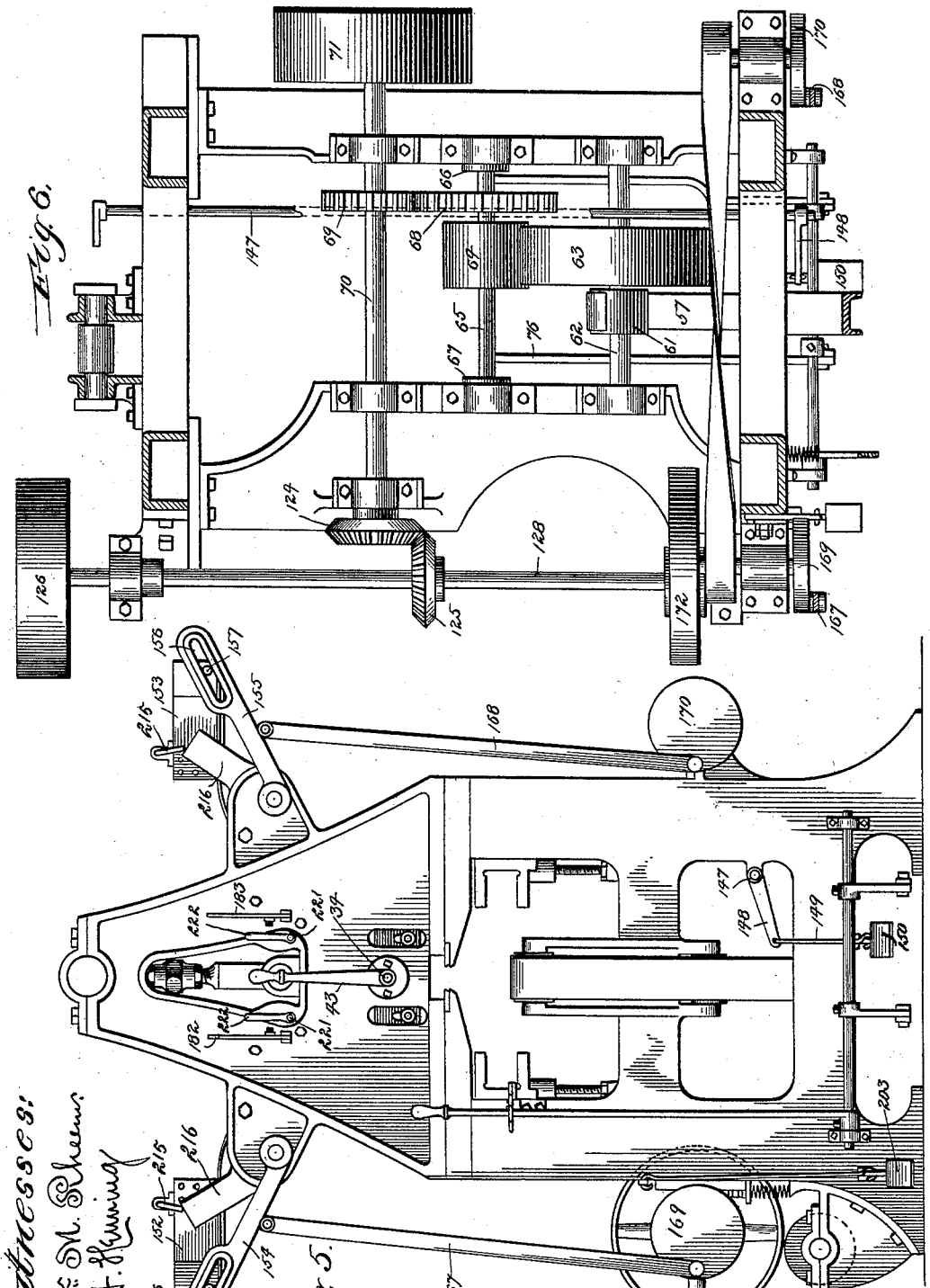

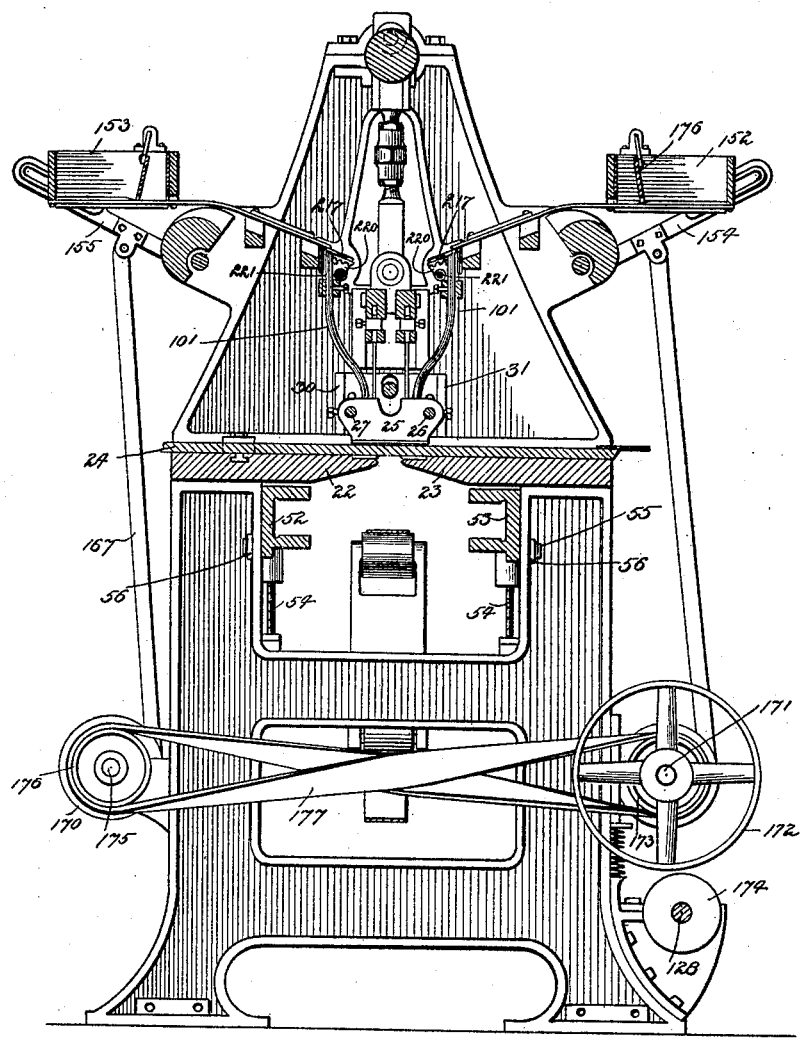

(No Model.)
10 Sheets—Sheet 7.
T. B. ABERNATHY.
BOX CUTTING AND NAILING MACHINE.
No. 593,551. Patented Nov. 9, 1897.
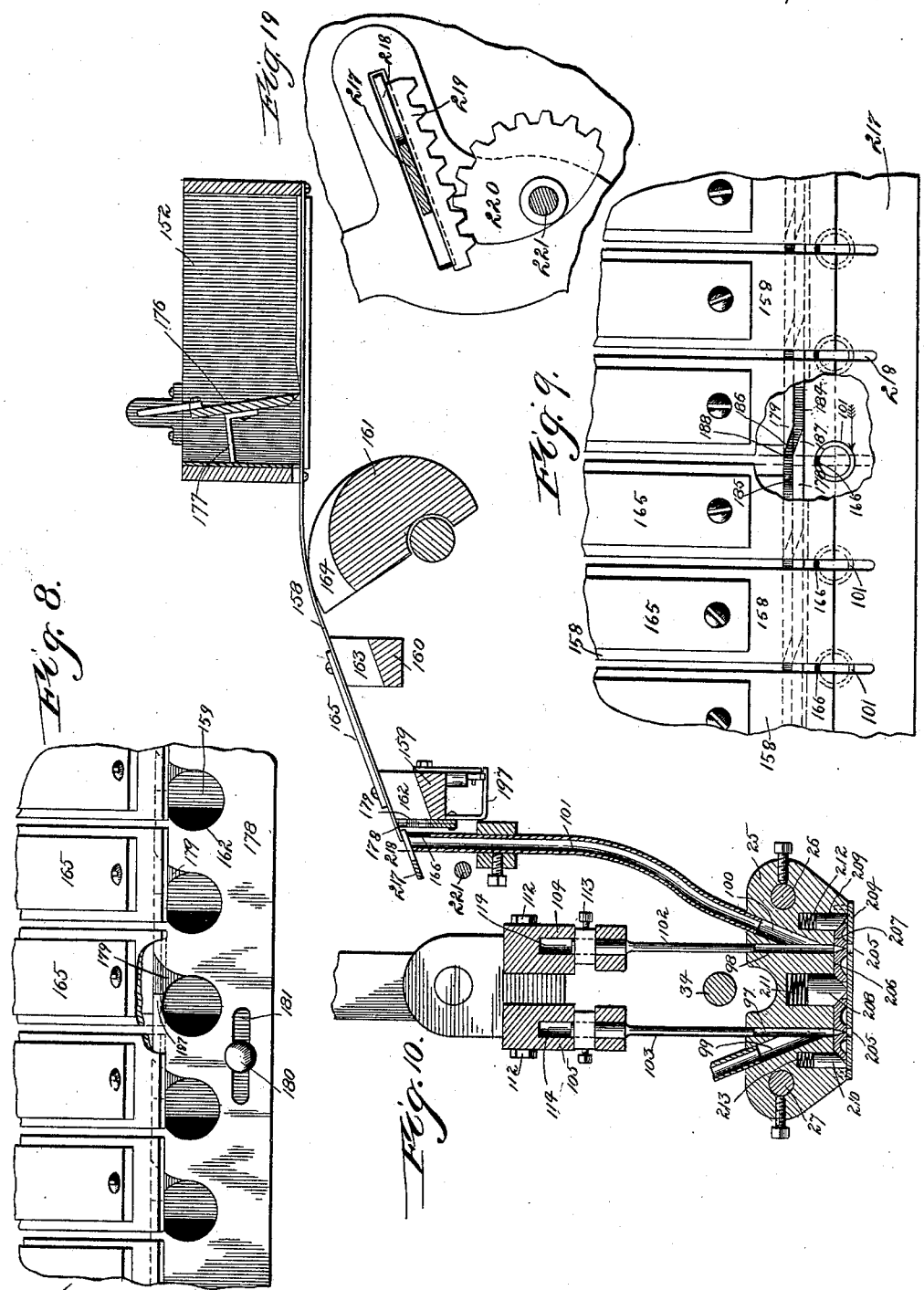

(No Model.) T. B. ABERNATHY. 10 Sheets—Sheet 8.
BOX CUTTING AND NAILING MACHINE.
No. 593,551. Patented Nov. 9, 1897.
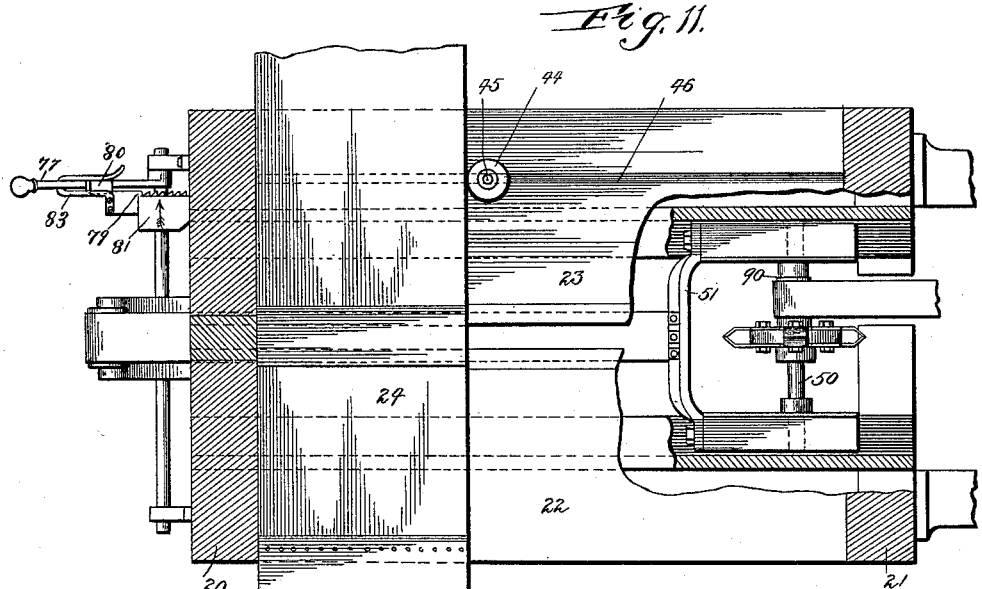
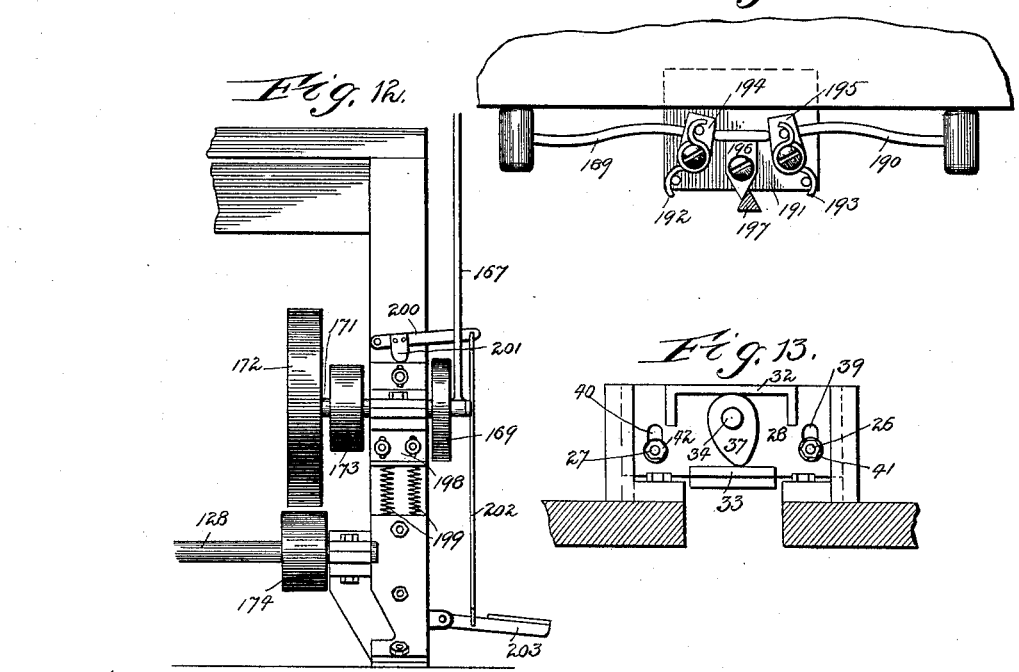
WITNESSES: Inventor:
Thomas B. Abernathy
by Bond Adams Pickard & Jackson
his Attys

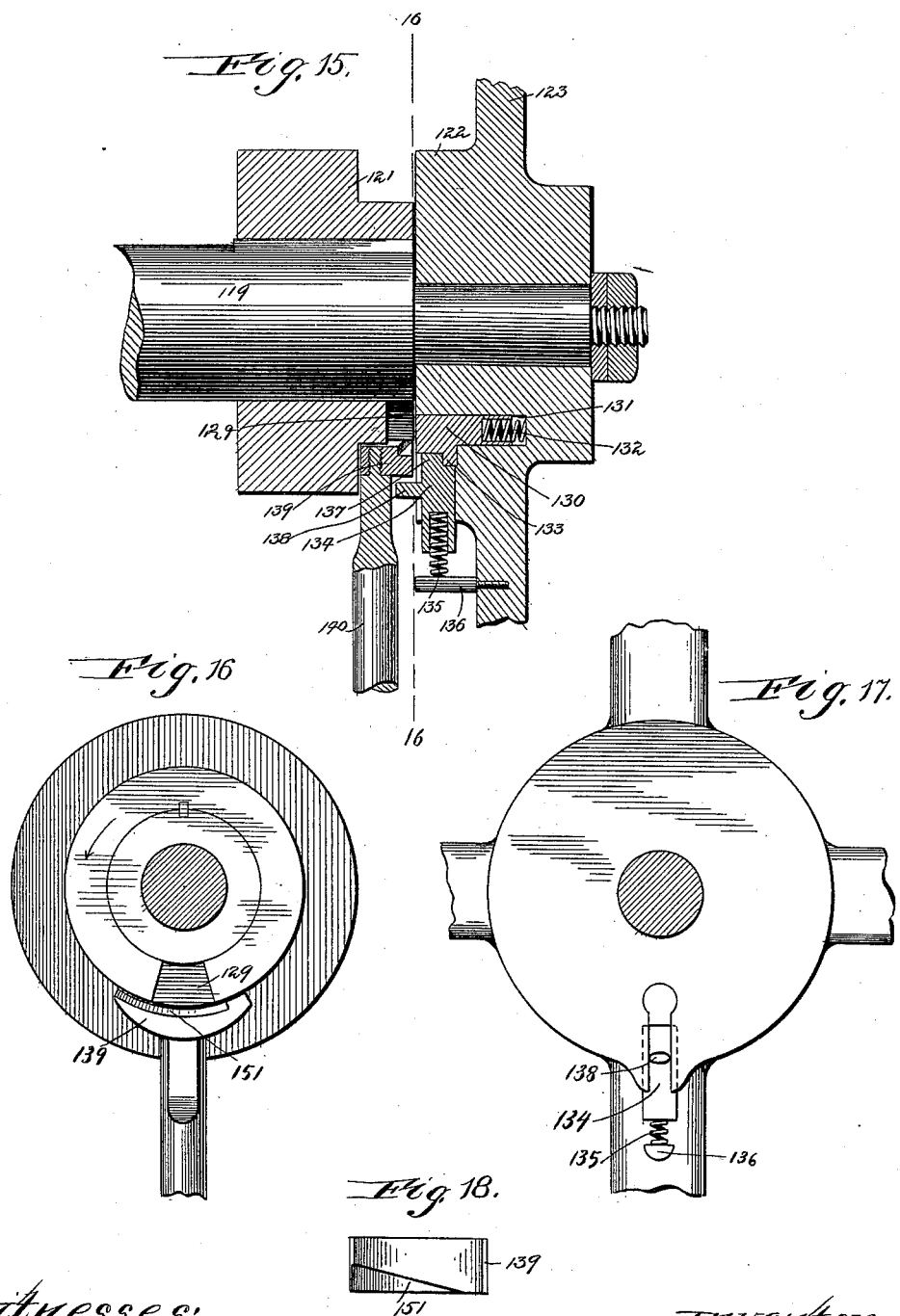

(No Model.)  10 Sheets—Sheet 10.
T. B. ABERNATHY.
BOX CUTTING AND NAILING MACHINE.

No. 593,551. Patented Nov. 9, 1897.

Witnesses:
Wm. N. Rheem.
Arthur F. Durand.

Inventor:
Thomas B. Abernathy
by Bond, Adams, Pickard & Jackson
his Attys.

UNITED STATES PATENT OFFICE.

THOMAS B. ABERNATHY, OF CHICAGO, ILLINOIS, ASSIGNOR TO HIMSELF AND HUGH H. ABERNATHY, OF SAME PLACE.

BOX CUTTING AND NAILING MACHINE.

SPECIFICATION forming part of Letters Patent No. 593,551, dated November 9, 1897.

Application filed February 16, 1893. Serial No. 462,606. (No model.)

*To all whom it may concern:*

Be it known that I, THOMAS B. ABERNATHY, a citizen of the United States, residing at Chicago, county of Cook, and State of Illinois, have invented certain new and useful Improvements in Box Cutting and Nailing Machines, of which the following is a specification, reference being had to the accompanying drawings, in which—

Figure 1:
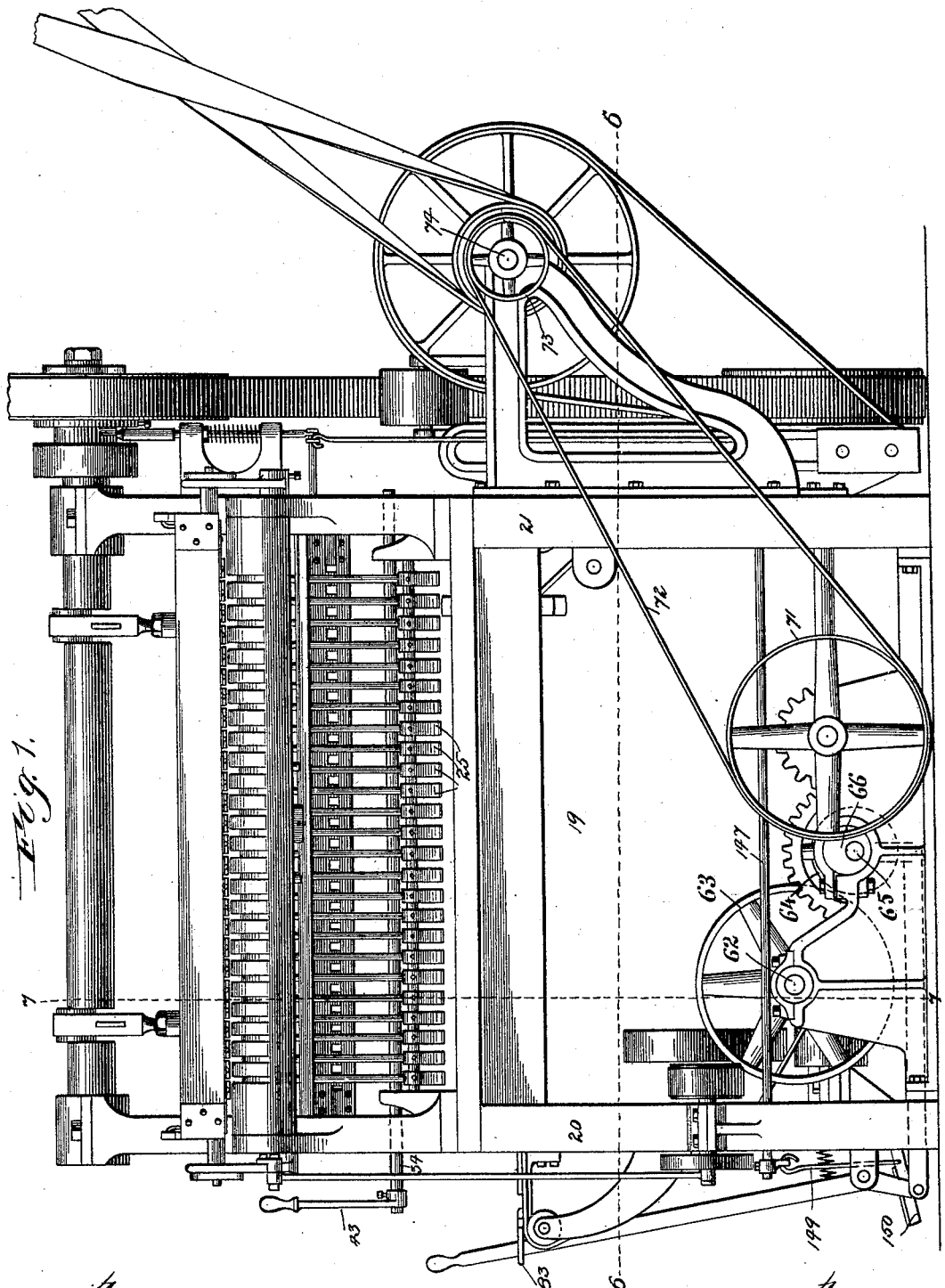
Figure 2:
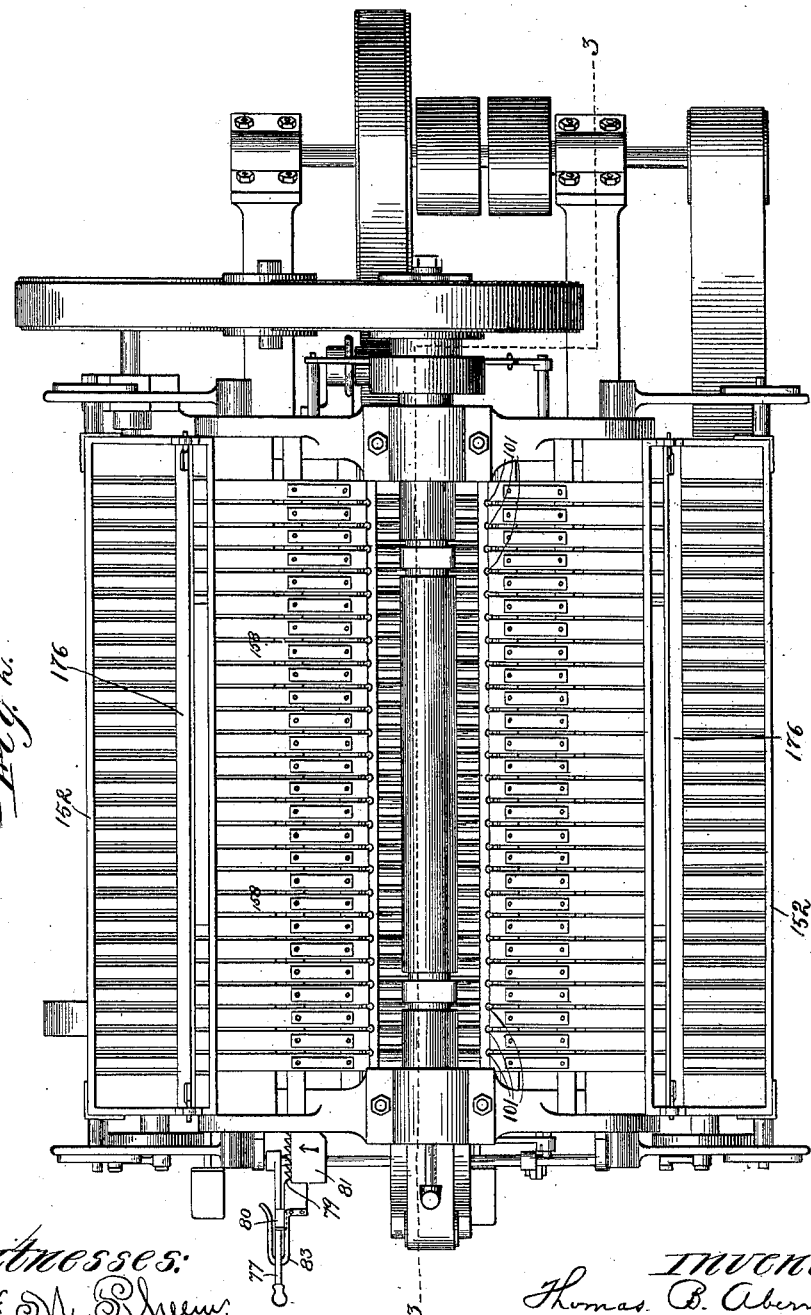
Figure 3:
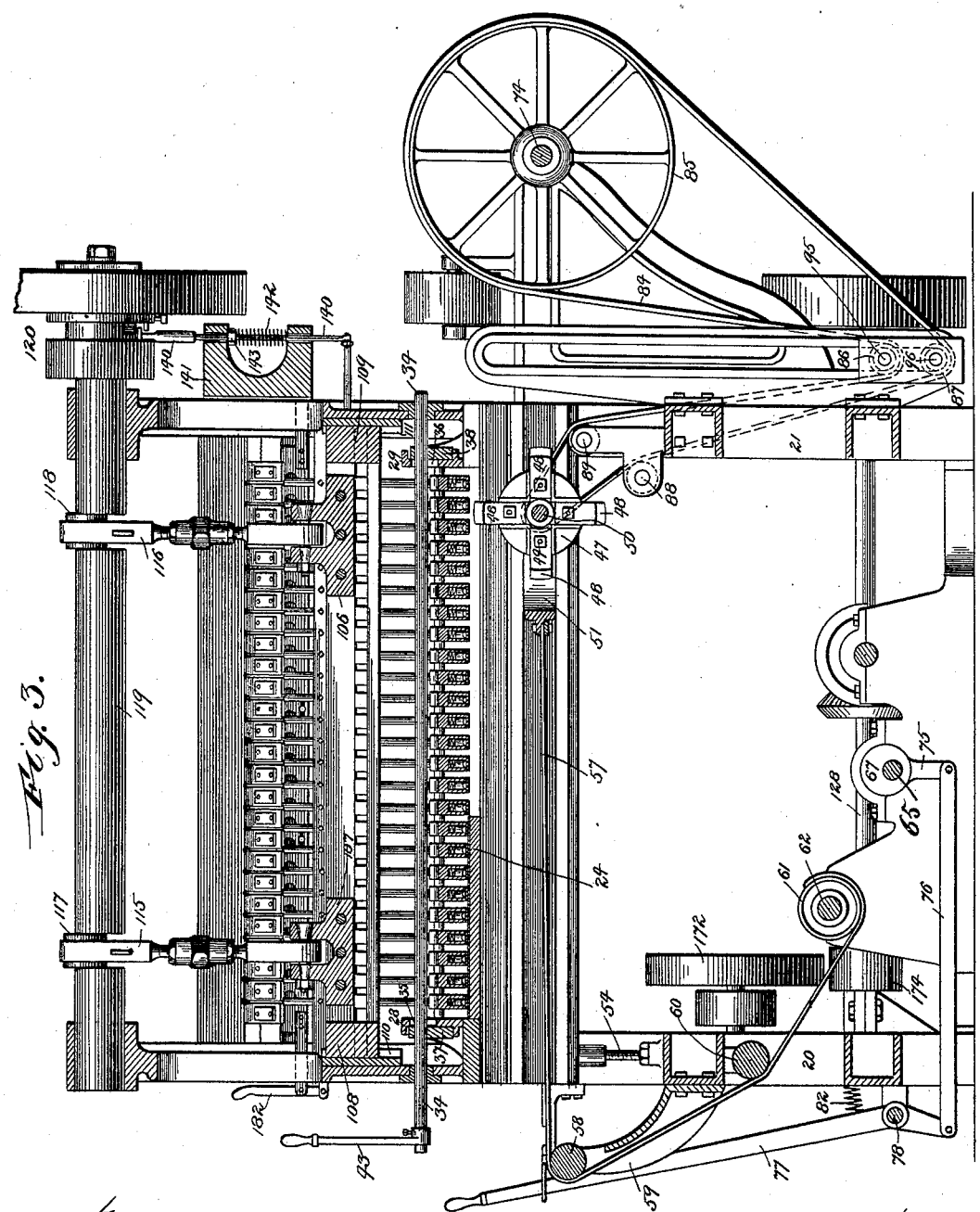
Figure 4:
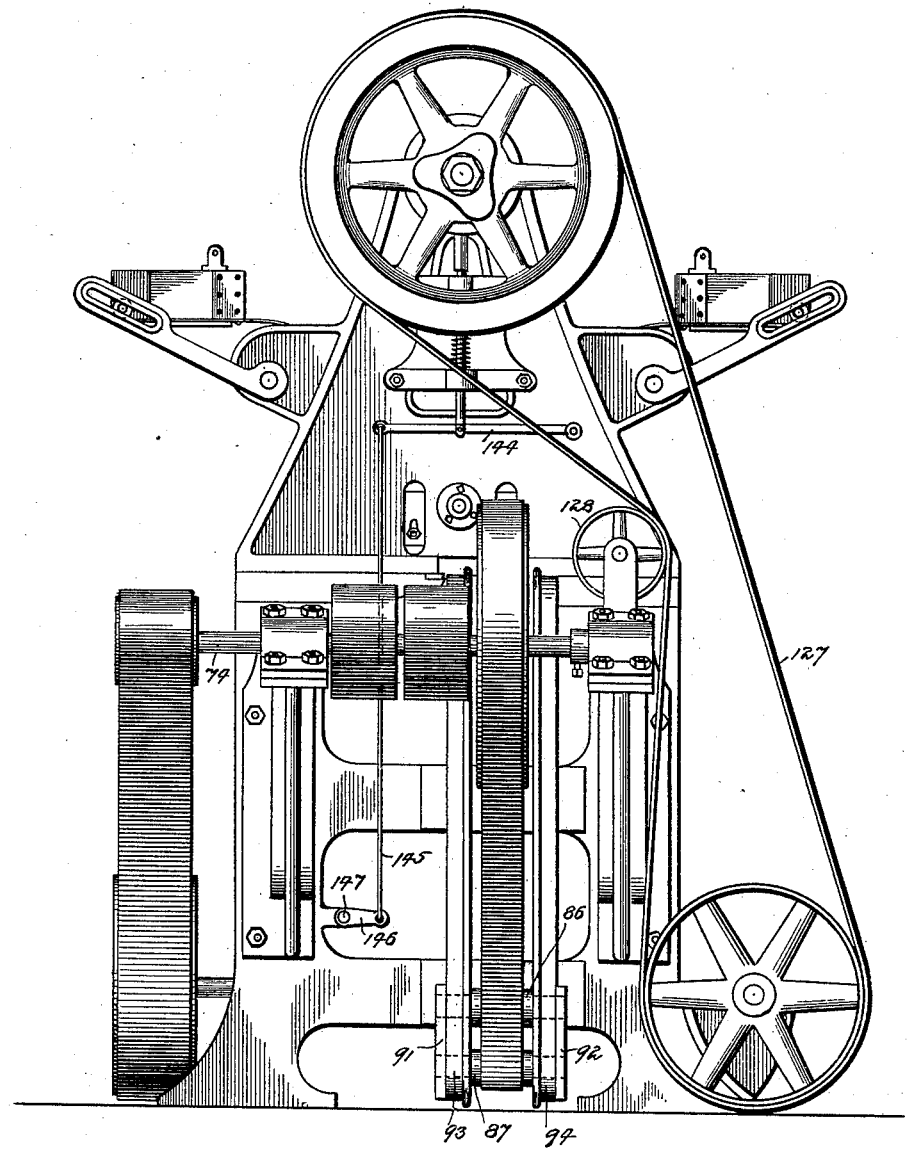
Figure 21:
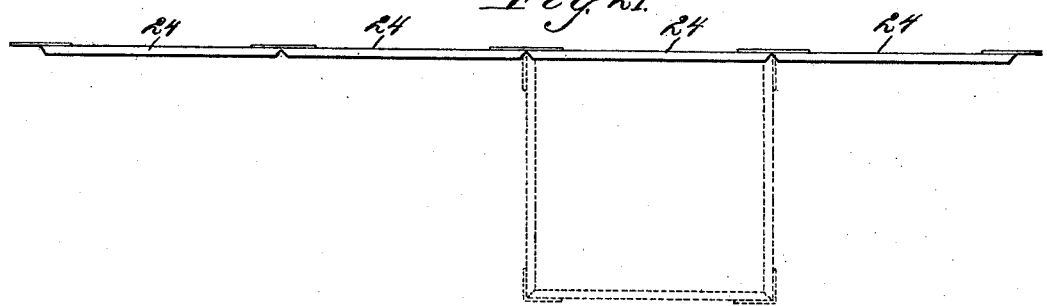
Figure 20:

Figure 1 is a side elevation. Fig. 2 is a top or plan view. Fig. 3 is a longitudinal vertical section on line 3 3 of Fig. 2. Fig. 4 is an elevation of one end. Fig. 5 is an elevation of the end opposite to that shown in Fig. 4. Fig. 6 is a horizontal section on line 6 6 of Fig. 1. Fig. 7 is a vertical cross-section on line 7 7 of Fig. 1. Fig. 8 is an enlarged detail showing the mechanism for feeding the nails. Fig. 9 is a top view of the parts shown in Fig. 8. Fig. 10 is an enlarged detail, being a sectional view of the nail feeding and driving apparatus. Fig. 11 is an enlarged detail, being a top or plan view of the table which carries the board to be cut and nailed. Fig. 12 is a detail, being a view of a portion of one end of the machine, showing the mechanism for throwing into operation the mechanism for agitating the nail-feeding devices. Fig. 13 is a detail, being a view of the mechanism for operating the board-clamps. Fig. 14 is an enlarged detail, being a view of the mallets which agitate the lower ends of the nail-guides. Fig. 15 is an enlarged detail, being a sectional view of the clutch by means of which the nailing mechanism is thrown into operation. Fig. 16 is a sectional view on line 16 16 of Fig. 15, looking to the left. Fig. 17 is a similar view looking to the right; and Fig. 18 is a detail, being a top or plan view of the block which throws the clutch-dog out of operation. Fig. 19 is an enlarged detail of a portion of the nail-feeding mechanism. Fig. 20 is an edge view of a board carrying the metallic strips and ready for mitering. Fig. 21 is a similar view showing the board mitered, and Fig. 22 is a perspective view of a box made from a board nailed and cut on my improved machine.

Figure 22:
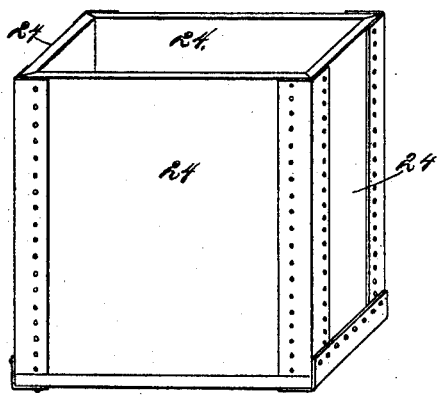

My invention relates to machines for making boxes, and has for its object to produce a machine which will be particularly adapted to be used for making boxes formed by cutting transverse miter-grooves at suitable points in a continuous board and nailing strengthening-strips upon the board over such grooves in such manner that the board may afterward be bent into box shape and its ends then united to form the sides of a box, as shown in Figs. 21 and 22. I accomplish this object as hereinafter specified and as illustrated in the drawings.

That which I regard as new will be pointed out in the claims.

In my improved machine a board of sufficient length to form the sides of a box, the width of which is equal to the height of the box, is introduced into the machine and rests upon a table adapted to receive it and support it during the cutting and nailing operations. At a proper distance from the end of the board first introduced into the machine a miter-groove is cut in its under side, which extends transversely of the board, the board being held rigidly by clamps provided for that purpose. Before the mitering a metallic strip is placed transversely upon the upper side of the board over the line of the proposed groove and is afterward secured in place by nails which are driven by the machine through the metallic strip into the board. The board is then moved along and the remaining grooves are cut and strengthening-strips nailed to the board substantially in the manner described for the first, after which the board is removed and is bent into box shape and its ends secured together, thereby forming the sides of a box, as shown in Figs. 20, 21, and 22. As the depth of the groove at its deepest point is equal to the thickness of the board, the board is held together by the metallic strips.

It will be understood that the nature of the groove, as well as the number of grooves, will depend upon the shape of the box, a miter-groove being used if the box is to be rectangular, in which case four grooves would be cut in each board. The shape of the box, however, may be varied as desired.

I will now describe specifically the construction of my improved machine by referring to the accompanying drawings, in which—

19 indicates the supporting-frame, composed of end pieces 20 21, connected by horizontal plates 22 23, as best shown in Fig. 7. The plates 22 23 serve as a table to receive the board to be operated upon, which board I have indicated by 24 in the drawings. The adjacent edges of the plates 22 23 are slightly separated from each other, forming a narrow slot through which the cutting devices which cut the groove in the board may extend, which arrangement is best shown in Fig. 7.

25 indicates a series of clamps connected to each other by rods 26 27, as best shown in Fig. 7, the ends of which rods are connected to blocks 28 29. In order to permit of adjusting the position of the clamps 25, the ends of the rods 26 27 pass through slots 39 40, arranged vertically in the blocks 28 29 and are secured to the blocks 28 29 by nuts 41 42, adapted to be screwed upon the ends of said rods 26 27 to hold them firmly in place. By adjusting the position of the rods 26 27 in the slots 39 40 the height of the clamps 25 may be adjusted. The blocks 28 29 are vertically movable in guides 30 31, carried by the end pieces 20 21, as best shown in Figs. 7 and 13. Upon the outer sides of the blocks 28 29 are provided upper flanges 32 and lower flanges 33, as best shown in Fig. 13.

34 indicates a shaft mounted in suitable bearings in the end pieces 20 21, as best shown in Fig. 3, which shaft passes through slots 35 36 in the blocks 28 29, as shown in Fig. 3.

37 38 indicate cams which are mounted upon the shaft 34 opposite the blocks 28 29 and between the upper and lower flanges 32 33 of said blocks. The shape of the cams 37 38, as best shown in Fig. 13, is such that by rotating the shaft 34 the cams may be made to bear against either the upper or lower flanges 32 33 to move the blocks 28 29 up or down, thereby moving the clamps 25 in a similar direction.

43 indicates a hand-lever which is mounted upon and keyed to one end of the shaft 34, as best shown in Figs. 3 and 5. By rocking the shaft 34 by means of the lever 43 the clamps 25 may be moved into or out of engagement with the board 24 at will. For convenience that end of the machine at which is mounted the lever 43 will be referred to hereinafter as the front end.

44 indicates a guide-roller which is mounted upon a shaft 45, secured in a slot 46, extending longitudinally of one of the plates 22 or 23, as best shown in Fig. 11. The roller 44 is provided with a suitable clamp adapted to secure it adjustably in the slot 46, by which arrangement it may be adjusted as may be necessary in operating upon boards of different widths. The roller 44 is designed to hold the board 24 in close contact with the adjacent end of the machine, as shown in Fig. 11.

47 indicates a rotary cutter-head, which, as shown, is provided with four cutters 48, arranged successively at right angles to each other. The form of cutters shown in the drawings is designed for cutting a mitergroove, but, as above stated, the shape may be varied for cutting grooves of different shapes. The cutters 48 are removably secured to the cutter-head by bolts 49, as shown in Fig. 3. The cutter-head 47 is mounted upon a shaft 50, which is journaled in a frame 51, as best shown in Figs. 3 and 11. The frame 51 is supported horizontally on the frame 19 of the machine, its sides being fitted in guides 52 53, as best shown in Fig. 7, which guides extend longitudinally of the machine, as best shown in Figs. 3 and 5. The guides 52 53 are supported in place by screw-threaded rods 54, the lower ends of which rods are supported by the end pieces 20 21, as shown in Figs. 3 and 7. The arrangement is such that by screwing the rods 54 into or out of their sockets in the guides 52 53 the guides may be raised or lowered. To further hold the guides 52 53 in position, they are provided at the back with bolts 55, which project through slots in the end frames and are secured in place by nuts 56. By adjusting the guides 52 53 vertically the frame 51 may also be adjusted vertically, raising or lowering the cutter-head 47 and providing for a deeper or shallower groove in the board. The cutter-head frame 51 is moved forward by a belt 57, which is connected to its forward end and passes out of the front end of the machine over an idler 58, mounted in a bracket 59, thence over an idler 60 to a drum 61, to which it is securely attached, as best shown in Fig. 3. The drum 61 is mounted upon a suitable shaft 62, journaled in the lower portion of the machine, as best shown in Figs. 3 and 6.

63 indicates a friction-pulley mounted upon the shaft 62, as shown in Fig. 6.

64 indicates a second friction-wheel mounted upon a shaft 65, which is located near the shaft 62 and is parallel therewith. The shaft 65 is mounted eccentrically in disks 66 67, which are journaled in suitable bearings, as shown in Fig. 6.

68 indicates a gear-wheel which is mounted upon the shaft 65 and intermeshes with a gear-wheel 69, mounted upon a shaft 70.

71 indicates a band-pulley mounted upon the shaft 70.

72 indicates a belt by means of which the pulley 71 is driven from a pulley 73, mounted upon a shaft 74, which pulley 73 is driven from any suitable source of power.

The size and position of the pulleys 63 64 are such that by rotating the disks 66 67, which form the bearings of the shaft 65, the pulley 64 may be thrown into or out of contact with the pulley 63, and the teeth of the gears 68 69 are so arranged as to permit of such motion of the shaft 65 without throwing said gear-wheels out of mesh. Connected to each of the disks, as 66 67, is an arm 75, which arm is connected by a connecting-rod 76 to an operating-lever 77, pivoted upon a shaft 78. The arrangement is such that by moving the lever 77 backward the arms 75 will be swung forward, thereby throwing the shaft 65 toward the shaft 62 and bringing the pulley 64 into engagement with the pulley 63. The shaft 62 will thereby be caused to rotate, motion being imparted to it through the shaft 70, gears 68 69, and friction-pulleys 63 64. The belt 57 will thereby be wound upon the drum 61 and the frame 51 caused to move forward.

79 indicates a rack adapted to be engaged by a dog 80, carried by the lever 77, by means of which the lever 77 may be held back—that is, near the end 20 of the machine—thereby holding the friction-pulleys 63 64 in contact and causing the cutter-head frame 51 to move forward.

81 indicates a bar which is mounted immediately over the rack 79, which bar is adapted to move laterally slightly. The rear edge of the bar 81 is beveled, as shown in Figs. 2 and 11, and is in such position that as the cutter-head frame 51 moves forward when it reaches the front of the machine its forward portion will strike the inclined rear edge of the bar 81, thereby moving it laterally in the direction indicated by the arrow in Fig. 2. The dog 80 will thereby be forced out of engagement with the teeth of the rack and will fall forward under the action of gravity and because of the backward movement of the shaft 65, caused by the contact of the pulleys 63 64. To positively move such lever forward when released, as above described, I provide a spring 82 between said lever and the end piece 20, the tension of which spring tends to throw the lever 77 forward. 83 indicates a frame which supports the upper end of the lever. By this construction as soon as the cutter-head frame 51 reaches the front of the machine the mechanism which draws it forward is automatically thrown out of operation and it is permitted to return to the rear of the machine under the action of the returning mechanism, which will be hereinafter described. The cutter-head 47 is rotated by a belt 84, which passes over a pulley 85, mounted upon the shaft 74, and thence passes around idlers 86 87 88 89 to a pulley 90, mounted upon the shaft 50, as best shown in Figs. 3 and 11. The idlers 88 89 are mounted in the frame of the machine, as shown in Fig. 3. By the idlers 86 87 are carried counterpoise-blocks 91 92, which are movable vertically in guides 93 94, raised at the rear end of the machine, as best shown in Figs. 3 and 4. The blocks 91 92 are rigidly connected by shafts 95 96, which support the idlers 86 87, respectively, as shown in Figs. 3 and 4. When the cutter-head is at the rear of the machine the blocks 91 92 are in their lowermost position, as shown in Fig. 3. As the cutter-head moves forward the counterpoise-blocks rise until they reach their uppermost point, when the cutter-head is at the front of the machine. As soon as the lever 77 is thrown forward by the action of the carriage or frame 51, as above described, the counterpoise-blocks 91 92 serve to return the frame 51 and cutter-head to the rear of the machine.

Before the board has been grooved, as above described, a metal strip, the length of which is equal to the width of the board, is placed upon the board over the line of the proposed groove and is afterward secured thereto by nailing its edges to the board, as hereinbefore stated. To provide for so nailing the strips upon the board, each clamp 25 is provided with two vertical passages 97 98, arranged equally distant from the center, as shown in Fig. 10, and with two inclined passages 99 100, which open into the passages 97 98 near their lower ends, as shown in Fig. 10. Extending into each passage 99 100 is a nail-tube 101, each of which tubes is adapted to conduct nails singly from nail-supplying devices to the passage 98 or 99, to which it is connected. The construction and operation of the nail-supplying devices will be more fully hereinafter set forth.

102 103 indicate plungers adapted to reciprocate in the passages 98 99, respectively, which plungers serve to drive home the nails conducted to such passages by the tubes 101. The plungers 102 103 are arranged in rows, their upper ends being supported by bars 104 105, which bars are connected by cross-pieces 106 107 and by end pieces 108 109. The end pieces 108 109 are adapted to move in guides 110 111, arranged vertically in the ends 20 21 of the main frame of the machine, as best shown in Fig. 3. The bars 104 105 are connected to the cross-pieces 106 107 by bolts 112, as best shown in Figs. 3 and 10. For securing the plungers 102 103 in their respective bars 104 105 I provide set-screws 113, as best shown in Fig. 10, and to permit of the vertical adjustment of such plungers their upper ends are fitted in slots 114 in the bars 104 105, as shown in Fig. 10.

The bars 104 105 are suspended from pitmen 115 116, the upper ends of which are connected to crank-arms 117 118, respectively, carried by a crank-shaft 119, which extends centrally lengthwise of the machine and is journaled in suitable bearings therein, as best shown in Fig. 3. The lower ends of the pitmen 115 116 are pivotally connected to the cross-bars 106 107, as shown in Fig. 3. The crank-shaft 119 is adapted to be intermittently rotated through a clutch 120, consisting of clutch-sections 121 122, the clutch-section 122 being preferably formed integral with a pulley 123, which is driven from the shaft 70 through gears 124 125, pulley 126, and belt 127. The gear 125 and pulley 126 are mounted upon a shaft 128, which is arranged at right angles to the shaft 70 and which extends lengthwise, as shown in Fig. 6.

128 indicates an idler for the belt 127, as shown in Fig. 4.

The construction of the clutch which I propose to use is as follows: Opposite the clutch-section 122 in the clutch-section 121 is provided a recess 129, which is adapted to receive a dog 130, carried by the clutch-section 122, by means of which dog the two sections are adapted to be locked together. The dog 130 is fitted into a recess 131 in the clutch-section 122, in which recess is provided a spring 132, which tends to force the dog 130 out of its socket, as shown in Fig. 15. The dog 130 is provided on its under side with a lug 133, as shown in Fig. 15.

134 indicates a dog which serves to hold the dog 130 in its socket 131. The dog 134 is supported by the clutch-section 122 and is adapted to move vertically thereupon. It is held in its upper position by a spring 135, supported by a bar or other suitable support 136, as shown in Figs. 15 and 17. The dog 134 is provided with a shoulder 137, which is adapted to engage the dog 130 in front of its lug 133 and thereby hold it in position in its socket. The arrangement is such that by moving the dog 134 downward sufficiently the lug 133 will be released, thereby permitting the spring 132 to force the dog 130 out of its socket and into the recess 129 in the section 121 if such recess is in position to receive the dog 130. The dog 134 is provided on its outer face with a lug 138, which lug is adapted to be engaged by a plate 139, carried by a rod 140. The rod 140 is supported in a bracket 141, carried by the frame of the machine, in which it is movable vertically. It is normally held in its uppermost position by a spring 142, which bears against a nut 143, as best shown in Fig. 3. The lower end of the rod 140 is connected to a lever 144, pivotally mounted in the frame of the machine, as best shown in Fig. 4, and connected by a rod 145 to a crank-arm 146, carried by a rock-shaft 147, as shown in Figs. 1, 4, and 6. The rock-shaft 147 is suitably journaled in the frame of the machine and extends the length of the machine, its forward end projecting a short distance beyond the front of the machine, as shown in Fig. 1. The forward end of the shaft 147 is provided with a crank-arm 148, connected by a rod 149 to a foot-lever 150, by means of which the shaft 147 may be rocked to move the rod 140 downward. The foot-lever and its connections to the rock-shaft 147 are best shown in Figs. 1, 5, and 6. The arrangement of the plate 139 is such that when the rod 140 is moved downward by operating the foot-lever 150 the plate 139 will engage the lug 138, thereby moving the dog 134 downward and releasing the dog 130, thereby permitting it to enter the recess 129 in the clutch-section 121. The clutch-section 121 and shaft 119 will thereby be rotated through the clutch-section 122 and pulley 123. To provide for throwing the clutch-sections 121 122 out of engagement after each rotation, the upper face of the plate 139 is made concave in the arc of a circle, and it is provided with a wedge-shaped depression 151, as shown in Figs. 15 and 18. The arrangement is such that as the clutch-sections rotate in the direction indicated by the arrow in Fig. 16 the lower edge of the dog 130 will enter the depression 151, and by contact with its inclined inner edge the dog 130 will be gradually moved back into its recess 131 in the clutch-section 122. As soon as the lug 133 of the dog 130 passes beyond the shoulder 137 of the dog 134 the latter will be permitted to move upward, thereby locking the dog 130 in its socket. By this means the nailing mechanism is automatically thrown out of gear after each operation.

Nails are supplied to the nail-tubes 101 at each side of the machine from nail-boxes 152 153, carried at opposite sides of the machine, as best shown in Figs. 4, 5, and 7. The outer portions of the boxes 152 153 are supported by bars 154 155, which are pivoted in the frame of the machine, as shown in Figs. 4 and 5. The outer ends of the bars 154 155 are provided with slots 156, which receive pins 157, carried by the nail-boxes. The forward portions of the boxes 152 153 are supported by strips 158, which form the bottom of the boxes and serve as guides to conduct the nails from the boxes to the nail-tubes, as will be more fully hereinafter described. The strips 158 are located at sufficient distances apart to permit of the passage of the shank of a nail between them, and they are designed to support the nails by the heads as they pass along from the nail-boxes to the nail-tubes. The strips 158 are inclined after they leave the nail-boxes, as best shown in Figs. 7 and 10, and their lower ends rest over the upper ends of the nail-tubes 101, as best shown in Fig. 10. The strips 158 are further supported by supporting-bars 159 160 161, as best shown in Figs. 1, 7, and 10. The supporting-bars 159 160 161 are each provided at intervals with tongues 162 163 164, as shown in Fig. 10, which tongues project upward and bear against the under surface of the strip 158, which lies over them, as shown in Figs. 1, 7, and 10. The space between the successive tongues is of sufficient width to permit of the passage of the shank of a nail.

165 indicates strips, one of which is provided upon each strip 158 near its lower end, as best shown in Figs. 2, 8, and 9. The strips 165 serve to strengthen the guide-strips 158. The upper ends of the nail-tubes 101 are provided with slots 166, through which the shanks of the nails may pass into such tubes.

To insure the feeding of the nails the nail-boxes 152 153 are agitated, which is accomplished by oscillating the bars 154 155. To secure such oscillation the bars 154 155 are connected, respectively, by connecting-rods 167 168 to the crank-pins of disks 169 170, as best shown in Figs. 5 and 6. The disk 169 is mounted upon a shaft 171, which shaft also carries a friction-pulley 172 and a band-pulley 173, as best shown in Figs. 6 and 7. The friction-pulley 172 is adapted to frictionally engage a friction-pulley 174, mounted upon the shaft 128, as best shown in Figs. 3, 7, and 12, by which means the pulley 172 is rotated from the shaft 128 through the shaft 70 and pulley 71. The shaft 171 is journaled in a box 198, which box is vertically movable upon the frame of the machine, as best shown in Fig. 12. Springs 199 support the box 198 from beneath and hold it normally in its uppermost position.

200 indicates a lever pivotally mounted upon the frame of the machine and provided with an arm 201, adapted to engage the box 198 in such manner that by moving down the outer end of the lever 200 the box 198, through the arm 201, will be moved downward, thereby throwing the friction-pulley 172 into contact with the pulley 174.

202 indicates a connecting-rod which connects the lever 200 with a foot-lever 203, as best shown in Fig. 12. The foot-lever 203 is located at the front of the machine, as shown in Fig. 5. The disk 170 is mounted upon a shaft 175, which carries a pulley 176, operated by a belt 177 from the pulley 173, as best shown in Fig. 7. By this arrangement the pulley 170 will also be operated from the pulley 171, and as the belt 177 is crossed, as shown, the disks 169 170 will be rotated in opposite directions, thereby giving the bars 154 155 a similar oscillatory motion at the same time. By the construction shown by rotating the disks 169 170 the bars 154 155 will be oscillated, and by reason of such oscillation the outer ends of the nail-boxes 152 153 will be lifted and depressed, giving them a rocking motion. The elasticity of the strips 158 permits of such rocking of the nail-boxes, and the upper surface of the tongues 164, carried by the bars 161, is curved to permit of such rocking.

To cause the nails to leave the boxes 152 153 properly, plates 176 are provided, one in each box, which plates are pivoted at their upper ends, as best shown in Fig. 2, and are adapted to rock upon such pivots. The plates 176 are provided on their lower edges with notches, which are so placed as to lie over the spaces between the successive strips 158 and are of such size as to permit of the passage of the heads of the nails through them when the plates 176 are resting upon the bottom of the boxes, as shown in Fig. 10. Connected to the pivots of the plates 176, at the outside of the nail-boxes, are depending arms 215, which are adapted to engage the inclined surfaces of bars 216, secured to the frame of the machine, as best shown in Fig. 5. The bars 216 are stationary, and the arrangement is such that as the boxes 152 153 are rocked, as above described, the arms 215 will move upon the inclined surfaces of the bars 216, thereby causing the plates 176 to be rocked upon their pivots and by such rocking to push the mass of nails in the boxes back, and thereby permit the nails in the passages between successive strips 158 to move more freely from the boxes on their way to the nail-tubes.

177 indicates a strip, one of which is provided on each plate 176, which strip serves to limit the motion of such plates, as shown in Fig. 8.

To provide for the delivery of nails singly to the nail-tubes 101, two feed-plates 178 179 are provided, which extend longitudinally of the machine at the lower ends of the strips 158, as best shown in Figs. 8, 9, and 10. The plates 178 179 are secured together and are supported by pins 180, which pass through slots 181 in the plates 178 179 into the bars 159. The plates 178 179 are movable longitudinally of the machine by means of a hand-lever 182 183, pivoted at the front end of the machine, as shown in Figs. 3 and 5. To provide for the passage of the nails through the plates 178 179, said plates are provided with circular openings 184 185, respectively, which openings are connected by an inclined passage 186, formed by knife-edges 187 188, formed on the plates 178 179, respectively, as best shown in Fig. 9. The plates 178 179 being in the position shown in Figs. 8 and 9 the arrangement is such that by moving the plates in the direction indicated by the arrow in Fig. 9 the knife-edge 188 of the plate 179 will separate the lowermost nail from the others, and as the plates move as indicated such nail will be guided through the passage 186 and opening 184 and the slot 166 in the nail-tube. The guide-strips 158 terminate substantially centrally over the nail-tubes 101.

217 indicates plates provided with slots 218, which are so located as to be adapted to register with the spaces between the guide-strips 158 at each side of the machine when the plates 217 are in position. One of the plates 217 is secured, preferably, in an inclined position at the lower end of each series of guide-strips 158 and extends slightly under the ends of such guide-strips, its slots 218 registering with the spaces between such guide-strips, as best shown in Figs. 9 and 10. The plates 217 are so mounted as to be movable toward and from the guide-strips, the object of which will be more fully hereinafter stated. By this construction, when the nails are moved downward by the action of the feed-plates 178 179, they will pass into the slots 218 and will be supported by the plates 217, their shanks lying in the upper ends of the nail-tubes 101. To release the nails and permit them to drop into the nail-tubes, the plates 217 are moved back from the guide-strips 158 until the edges of the plates 217 come substantially into line with the inner edges of the nail-tubes, when the nails will be moved out of the slots 218 and permitted to drop through the nail-tubes. To accomplish the moving of the plates 217, I provide each of them with a rack 219 on the under side, which rack meshes with the gear 220, mounted upon the shaft 221, extending longitudinally of the machine. The shafts 221 are operated from the front of the machine by hand-levers 222, as best shown in Fig. 5. By rotating or partially rotating the levers 222 the gears 220 may be moved in the desired direction, thereby moving the plates 217 toward or away from the guide-strips 158. By this means the feeding of the nails singly is made certain.

As it may happen that the nails at the lower ends of the guide-strips may not move readily, mallets 189 190 are provided, which are pivotally mounted in the plate 191 under the bar 159, and are held in contact with such bar by springs 192 193, as best shown in Fig. 14. The mallets 189 190 are connected, respectively, to arms 194 195, which are adapted to be engaged by a tappet 196, pivoted upon the plate 191, as best shown in Fig. 14. The arrangement is such that by rocking the tappet 196 it will be moved into contact with one or the other of the arms 194 195, thereby throwing the mallets connected to said arms alternately out of contact with the bars 159. As the tappet rocks in the opposite direction, the mallet so thrown out of contact with the bar 159 will be returned by the action of a spring and will jar such bar, thereby jarring the superposed strip 158 through the tongue 162. To effect the rocking of the tappet 196, its lower portion is beveled, as shown in Fig. 14, and is adapted to be engaged by a dog 197, which is connected to the plates 178 179 and moves with them. The arrangement is such that as said plates 178 179 are reciprocated by the operator the dog 197 will alternately engage the opposite sides of the tappet 196 and thereby rock it.

Upon the bottom of each clamp 25 is secured a plate 204, as best shown in Fig. 10, which plate is provided with two holes 205, one under each passage 97 98. The holes 205 are normally closed by means of blocks 206 207, which rest in suitable recesses in the clamp 25 over the plate 204. The adjacent edges of each pair of blocks 206 207 are beveled or inclined, as shown in Fig. 10, forming a conical recess adapted to receive the point of a nail. The plates 206 207 are normally held in contact with each other by means of a central block 208 and by lateral blocks 209 210. The lower faces of the blocks 208 209 210 are beveled, as shown in Fig. 10, and they bear against the edges of the blocks 206 207, which are also beveled, as shown. The blocks 208 209 210 are held in their lowermost positions, respectively, by springs 211 212 213, fitted in the clamp 25 above them, as shown in Fig. 10. By this construction the blocks 206 207 may be moved laterally away from each other to permit of the passage of a nail, after which they will be returned into contact with each other at the center of the openings 205 through the action of the blocks 208 209 210. The openings 205 in the plate 204 will thereby be kept closed, except during the operation of driving the nails.

The operation of the machine in brief is as follows: The board being placed upon the table formed by the plates 22 23 a metallic strip is placed upon it, and it is clamped in position by operating the lever 43, after which the lever 77 is thrown back and held in position by the rack 79. By operating the lever 77 the frame 51 will be thrown forward, thereby moving the cutter-head forward and cutting a groove in the under side of the board. As soon as the cutter-head frame reaches the front of the machine the lever 77 will be thrown out of engagement with the rack 79 and the cutter-head will be permitted to return to the back of the machine. The hand-levers 182 183 are then operated to cause a nail to be fed into each tube 101, whence they pass downward into the passages 97 98. By then operating the foot-lever 150 the clutch-sections 121 122 will be thrown into engagement with each other and the shaft 119 given one revolution, by means of which the plungers 102 103 will be moved downward and the nails in the passages 97 98 will be driven through the metallic strip into the board on opposite sides of the groove. At convenient intervals by operating the foot-lever 203 the nail-boxes will be agitated and the nails caused to move downward between the guide-plates in position to be fed into the nail-tubes.

The object of the plates which hold the nails over the nail-tubes is to cause the nails to drop properly into the nail-tubes and prevent them from clogging the tubes. It will be understood that when the nails are supported by their heads in the inclined guides by which they are conducted from the nail-boxes and when the lowermost nail reaches the end of the guides it will be held by one edge of its head, thereby causing the shank of the nail to assume an inclined position, throwing the point toward the side of the nail-tube and sometimes out of the slot through which the nail enters the tube. The plate 217 serves to support the nail when it is delivered from the inclined guides and to carry it over to the opposite side of the nail-tube, so that the danger above pointed out is avoided.

That which I claim as my invention, and desire to secure by Letters Patent, is—

1. A combined scoring and nailing machine comprising means for supporting a board, cutting mechanism adapted to form transverse grooves in the board, and nailing mechanism for securing strengthening-strips upon the board over such grooves, substantially as described.

2. The combination with supporting devices adapted to support a board, of cutting mechanism adapted to cut a groove in said board, and nailing mechanism, adapted to drive nails into said board at each side of said groove, substantially as described.

3. The combination with supporting devices adapted to support a board, of cutting mechanism adapted to cut a groove in the under side of said board, and nailing mechanism, adapted to drive nails into the upper side of said board at each side of said groove, substantially as described.

4. The combination with supporting devices adapted to support a board, of cutting mechanism adapted to cut a groove in said board, and nailing mechanism for driving independent nails into said board at each side of said groove, substantially as described.

5. The combination with supporting devices adapted to support a board, of cutting mechanism adapted to cut a groove in the under side of said board, and nailing mechanism above said cutting mechanism, said nailing mechanism being adapted to drive nails into the upper side of said board at each side of said groove, whereby a strengthening-strip may be secured upon the board over said groove without moving said board, substantially as described.

6. The combination with supporting devices adapted to support a board, of cutting mechanism adapted to cut a transverse groove in the under side of said board, and nail-driving devices arranged above said board longitudinally of said groove and at each side thereof, whereby strengthening-strips may be nailed upon said board over and longitudinally of said groove, substantially as described.

7. The combination with nail-driving mechanism, of a nail-receptacle, a nail-tube leading to the driving mechanism, flexible guide-strips adapted to conduct nails from said receptacle to said nail-tube, and means for agitating said receptacle, substantially as described.

8. The combination with nail-driving mechanism, of a nail-receptacle, flexible guides adapted to conduct nails from said receptacle to said driving mechanism, said guides consisting of flexible strips spaced a distance apart and connected to and forming the bottom of said nail-receptacle, and means for agitating said receptacle, substantially as described.

9. The combination with nail-driving mechanism, and a series of nail-tubes adapted to conduct nails thereto, of a receptacle 152, strips 158 adapted to conduct nails from said receptacle to said nail-tubes, said strips forming the bottom of the receptacle 152, a pivoted plate 176 in said receptacle, said plate having a series of notches in its lower edge, said notches registering with the spaces between said strips 158, and means for rocking said receptacle 152 and said plate, substantially as described.

10. The combination with nail-driving mechanism, and nail-tubes adapted to conduct nails thereto, and flexible guides for the nails, of supporting devices adapted to receive nails singly from said flexible guides and support them at the upper ends of said nail-tubes, means for delivering nails singly to said supporting devices, and means for delivering the nails to the nail-tubes from the supporting devices singly and without clogging, substantially as described.

11. The combination with nail-driving mechanism, and tubes adapted to conduct nails thereto, of strips 158, plates 178, 179 adapted to supply nails singly from said strips to said tubes, a dog 197 carried by said plates, cross-bar 159 supported under the lower end of said strips 158, said bar having tongues 162 which bear against the under side of said strips, mallets 189, 190 adapted to engage the under side of said bar 159, springs 192, 193, a tappet 196 adapted to throw said mallets out of contact with said bar 159 and to be engaged by said dog, and means for reciprocating said plates 178, 179, substantially as described.

12. The combination with a scoring device and nail-feeding devices, of reciprocating plungers 102, supporting devices for said plungers, a crank-shaft arranged over said supporting devices, pitmen connecting said supporting devices to said crank-shaft, whereby by the rotation of said crank-shaft said supporting devices will be reciprocated, means for rotating said crank-shaft, and devices for automatically throwing said crank-shaft out of operation after each complete rotation thereof, substantially as described.

13. The combination with a clamp, as 25, said clamp having a vertically-arranged passage 98 and a nail-passage 100, of a plate 204 carried by said clamp, said plate having a perforation to permit of the passage of a nail, laterally-movable blocks supported upon said plate under said passage 98, the adjacent edges of said blocks being beveled, and vertically-movable blocks for normally holding said laterally-movable blocks in contact with each other centrally over said perforation, substantially as described.

14. The combination with a clamp, as 25, having a vertical passage 98 and a nail-passage 100 opening into said passage 98, of a plate 204 at the under side of said clamp, said plate having a perforation 205, blocks 206, 207 resting upon said plate, said blocks having inclined outer and inner edges, vertically-movable blocks 208, 209 adapted to engage the outer edges of said blocks 206, 207 respectively, and springs exerting a downward pressure upon said blocks 208, 209, substantially as and for the purpose specified.

15. The combination with a supporting-table, of a series of clamps 25 adapted to clamp a board upon said table and each provided with a nail-passage, rods connecting said clamps, means for vertically moving the clamps to release the board from the table, perforated plates at the under sides of said clamps, laterally-movable blocks supported upon said plates, and vertically-movable blocks for normally holding the said laterally-movable blocks in contact with each other centrally over the perforations in said plates, substantially as described.

16. The combination with a supporting-table having a longitudinal slot, of a cutter, mechanism for moving said cutter longitudinally in one direction, means for automatically throwing said mechanism out of operation when the end of the cut is reached, and a counterpoise for moving said cutter in the opposite direction, and nailing mechanism for driving nails at the opposite sides of the groove formed by said cutter, substantially as described.

17. The combination with a supporting-frame, and horizontal guides carried thereby, said guides being vertically adjustable, of a supporting-frame movable in said guides, a cutter carried by said frame, mechanism for moving said frame in a forward direction, nailing mechanism for driving nails at the opposite sides of the groove formed by said cutter, and means for moving said cutter back to the rear of the machine, substantially as described.

18. The combination with guides, a frame movable therein, and a cutter carried by said frame, of devices for moving said frame in said guides, a lever 77 for throwing said moving devices into operation, a rack adapted to engage said lever to hold said moving devices in operation, devices adapted to be engaged by the cutter-supporting frame when it reaches the front of the machine to throw said lever out of engagement with said rack, and thereby permit the return of said frame to the rear of the machine, and devices for returning said frame, substantially as described.

19. The combination with guides, a frame 51, and a rotating cutter mounted therein, of a strap 57 connected to said frame 51, a drum to which is connected the other end of said strap, said drum being mounted upon a shaft 62, friction-pulleys 63, 64, said pulley 64 being mounted on a shaft 65 journaled eccentrically in disks 66, 67, means for rotating said disks 66, 67 to throw said friction-pulleys into contact with each other, a rack adapted to be engaged by said lever to hold said friction-pulleys in contact with each other, devices operated by said frame 51 for throwing said lever out of engagement with said rack, means for returning the frame 51 to the rear of the machine, and means for rotating said cutter, substantially as described.

20. The combination with nail-tubes, guides, and devices for separating the lowermost nail carried by each of said guides from the others, of a plate over said nail-tubes, said plate being adapted to receive the nails and to support them over the nail-tubes, and means for operating said plate to cause the nails to drop into the nail-tubes, substantially as described.

21. The combination with nail-tubes, guides 158, and devices for delivering nails singly from said guides, of a plate 217 having slots 218 registering with the guide-spaces, and means for operating said plate to cause the nails carried by it to drop into the nail-tubes, substantially as described.

THOMAS B. ABERNATHY.

Witnesses:
A. H. ADAMS,
J. M. BRISTOL.